US012758901B2

(12) United States Patent
Zhu et al.

(10) Patent No.: US 12,758,901 B2
(45) Date of Patent: Oct. 13, 2026

(54) SAND REMOVAL DEVICE FOR COOLING TOWER AND COOLING TOWER STRUCTURE

(71) Applicant: BITMAIN TECHNOLOGIES INC., Beijing (CN)

(72) Inventors: Hongshan Zhu, Beijing (CN); Hangkong Hu, Beijing (CN); Shaoming Huang, Beijing (CN); Zesen Nie, Beijing (CN); Te Pi, Beijing (CN); Fengjie Li, Beijing (CN)

(73) Assignee: Bitmain Technologies INC., Beijing (CN)

( * ) Notice: Subject to any disclaimer, the term of this patent is extended or adjusted under 35 U.S.C. 154(b) by 390 days.

(21) Appl. No.: 18/649,867

(22) Filed: Apr. 29, 2024

(65) Prior Publication Data

US 2024/0359115 A1 Oct. 31, 2024

(30) Foreign Application Priority Data

Apr. 28, 2023 (CN) ......................... 202321020903.7

(51) Int. Cl.
*B01D 21/26* (2006.01)
*B01D 21/00* (2006.01)
*B01D 21/24* (2006.01)

(52) U.S. Cl.
CPC ....... *B01D 21/267* (2013.01); *B01D 21/0024* (2013.01); *B01D 21/245* (2013.01)

(58) Field of Classification Search
CPC B01D 21/0024; B01D 21/245; B01D 21/267; F28C 1/00; F28F 19/01
See application file for complete search history.

(56) References Cited

FOREIGN PATENT DOCUMENTS

| | | | |
|---|---|---|---|
| CN | 101893390 | A | 11/2010 |
| CN | 107514931 | A | 1/2021 |
| CN | 212378593 | U | 1/2021 |
| EA | 43366 | B1 | 5/2023 |
| JP | 2021092346 | A | 6/2021 |
| RU | 2743154 | C9 | 5/2022 |

OTHER PUBLICATIONS

Notification of Grant of Patents Rights for Utility Models date Sep. 4, 2023 for Chinese Patent Application No. 202321020903.7.
Notice of Allowance dated Sep. 30, 2024 for Russian Application No. 2024111835/12(026740).

*Primary Examiner* — Patrick Orme

(57) ABSTRACT

The present application discloses a sand removal device for a cooling tower and the sand removal device comprises a flushing assembly and a cyclone sand removal assembly. The flushing assembly comprises a first pipeline with a plurality of water outlets, and the first pipeline is used to spray liquid towards the bottom of the cooling tower through the plurality of water outlets. The cyclone sand removal assembly is used to extract the liquid at the bottom of the cooling tower, perform a sand removal treatment on the liquid and then discharge the sand-removed liquid into the bottom of the cooling tower. Through the present application, the sand removal effect on the liquid can be improved.

13 Claims, 7 Drawing Sheets

SAND REMOVAL DEVICE FOR COOLING TOWER AND COOLING TOWER STRUCTURE

CROSS-REFERENCE TO RELATED APPLICATION

The present application claims priority to Chinese Patent Application No. 202321020903.7, filed on Apr. 28, 2023, which is hereby incorporated by reference in its entirety.

TECHNICAL FIELD

The present application relates to the technical field of sand removal, and in particular, relates to a sand removal device for a cooling tower and a cooling tower structure.

BACKGROUND

A cooling tower is a device used to exchange heat between the cooling water carrying waste heat and the air inside the tower body to dissipate the waste heat into the atmosphere, reducing the temperature of the cooling water, and achieving the recycling of the cooling water. However, in an environment with a high sand content, when the cooling water is cooled down in the cooling tower, the cooling water inevitably mixes and carries a large amount of sand in the air, affecting the recycling and reuse of the cooling water. The solutions in the prior art usually involve passing the collected cooling water through a self-cleaning sand filter with a plurality of standard high-speed sand tank units, or using a mesh filter to remove sand from the cooling water.

However, the water consumption of a self-cleaning sand filter during the sand removal process is too large. Moreover, since both the self-cleaning sand filter and the mesh filter are used to remove sand by extracting cooling water mixed with sand, if there is precipitated accumulated sand at the bottom of the cooling water after collection, the existing sand removal methods cannot remove the accumulated sand, resulting in poor sand removal effect.

SUMMARY

The present application provides a sand removal device for a cooling tower and a cooling tower structure, which reduces the complexity of the structure of the sand removal device and improves the sand removal effect while reducing water consumption.

In a first aspect, the present application provides a sand removal device for a cooling tower, which includes a flushing assembly and a cyclone sand removal assembly. The flushing assembly includes a first pipeline having a plurality of water outlets, and the first pipeline is used to spray liquid towards a bottom of the cooling tower through the plurality of water outlets. The cyclone sand removal assembly is used to extract the liquid at the bottom of the cooling tower, perform sand removal treatment on the liquid, and then discharge the sand-removed liquid into the bottom of the cooling tower.

In some possible implementations, the flushing assembly further includes a first circulation pump and a second pipeline. The first pipeline and the second pipeline are connected to the first circulation pump respectively. The first circulation pump is used to extract the liquid at the bottom of the cooling tower through the second pipeline and output the liquid to the first pipeline.

In some possible implementations, the first pipeline is arranged at the bottom of the cooling tower and surrounds the bottom of the cooling tower.

In some possible implementations, a gap is provided between the first pipeline and the bottom of the cooling tower.

In some possible implementations, the plurality of water outlets in the first pipeline face the bottom of the cooling tower and have oblique angles relative to a vertical direction of the bottom of the cooling tower.

In some possible implementations, the cyclone sand removal assembly further includes a third pipeline, a fourth pipeline and a second circulation pump. The second circulation pump is connected to the bottom of the cooling tower and a water inlet of the cyclone sand removal assembly respectively through the third pipeline, and the second circulation pump is used to extract the liquid from the bottom of the cooling tower through the third pipeline, and transport the liquid into the water inlet of the cyclone sand removal assembly. The fourth pipeline is connected to a water outlet of the cyclone sand removal assembly and the bottom of the cooling tower respectively, and is used to discharge the sand-removed liquid into the bottom of the cooling tower.

In some possible implementations, a connection point between the fourth pipeline and the bottom of the cooling tower is higher than a liquid level of the liquid at the bottom of the cooling tower.

In some possible embodiments, the cyclone sand removal assembly has a sand outlet. The sand outlet is connected to a sand storage assembly. The sand storage assembly is used to store accumulated sand discharged after the cyclone sand removal assembly performs a sand removal treatment on the liquid.

In some possible embodiments, the sand storage assembly includes at least one opening. Each opening of the at least one opening is provided with a cover plate for opening or closing the opening. When the opening is opened, the accumulated sand can be taken out of the sand storage assembly through the opening.

In some possible implementations, the sand storage assembly is provided with a holding structure, and the holding structure is used to hold the accumulated sand. The outer diameter of the holding structure is smaller than the inner diameter of the opening, and the holding structure can be taken out of the sand storage assembly through the opening.

In some possible implementations, the sand storage assembly is provided with a visual window. The visual window is used to display the amount of accumulated sand in the sand storage assembly.

In some possible embodiments, the cyclone sand removal assembly further includes a ball valve assembly. The ball valve assembly is arranged between the sand outlet and the sand storage assembly. The ball valve assembly is used to open or close the communication between the sand outlet and the sand storage assembly.

In a second aspect, the present application provides a cooling tower structure, which includes a cooling tower and the sand removal device as described in the first aspect, and the sand removal device is used to remove sand from the liquid at the bottom of the cooling tower.

Compared with the existing technology, the beneficial effects of the technical solution provided by the present application are as follows.

In the present application, the first pipeline sprays liquid towards the bottom of the cooling tower through a plurality of water outlets, which can stir sand at the bottom of the cooling tower evenly, so that when the liquid at the bottom of the cooling tower is extracted for sand removal by the cyclone sand removal assembly, the sand deposited at the bottom of the cooling tower may be smoothly extracted. In this way, the sand removal effect on the liquid can be improved.

It should be understood that the above general description and the following detailed description are only exemplary and explanatory, and do not limit the present application.

BRIEF DESCRIPTION OF DRAWINGS

The drawings here, which are incorporated in and constitute a part of the present specification, illustrate embodiments in accordance with the present application and together with the description, serve to explain the principles of the present application.

In the above figures.

Figure 1:
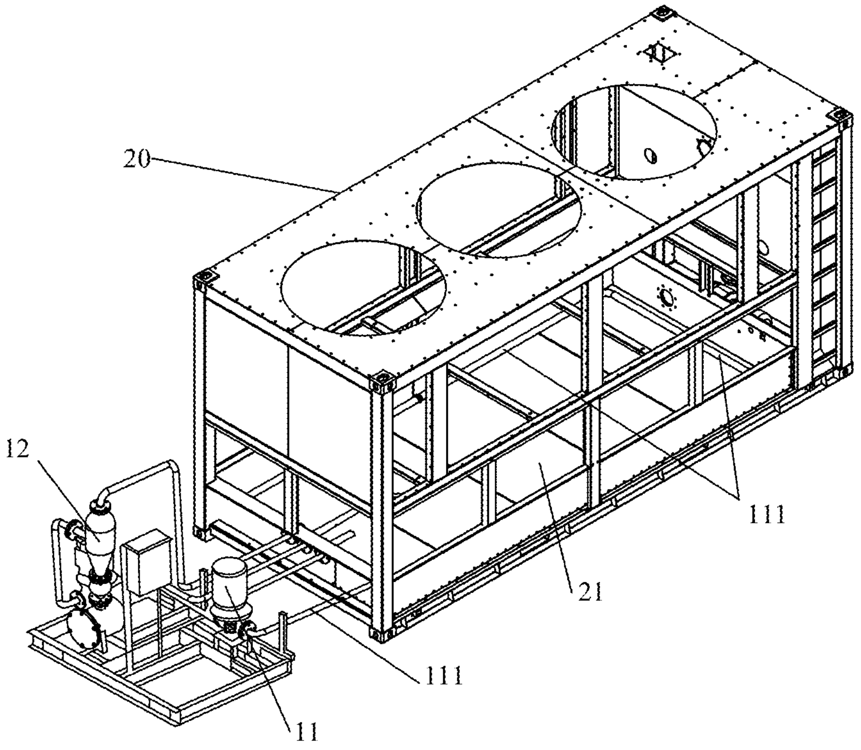
FIG. 1 is a structural schematic diagram of a sand removal device for a cooling tower in an embodiment of the present application.

10. Sand removal device; 11. Flushing assembly; 12. Cyclone sand removal assembly; 20. Cooling tower; 21. Accommodating space; 111. First pipeline; 31. Second pipeline; 32. First circulation pump; 41. Water outlet; 60. Main body; 61. Water inlet; 62. Water outlet; 63. Sand outlet; 71. Second circulation pump; 72. Third pipeline; 73. Fourth pipeline; 731. Connection point; 80. Sand storage assembly; 90. Holding structure; 91. Handle; 92. Through-hole; 100. Ball valve assembly.

DESCRIPTION OF EMBODIMENTS

Exemplary embodiments will be described in detail herein, examples of which are illustrated in the drawings. When the following description involves the drawings, unless otherwise indicated, the same numbers in different drawings refer to the same or similar elements. The implementations described in the following exemplary embodiments do not represent all implementations consistent with the present application. On the contrary, they are merely examples of devices consistent with some aspects of the present application as detailed in the appended claims.

Other implementation solutions of the present application will be readily apparent to those skilled in the art from consideration of the specification and practice of the disclosure claimed herein. The present application is intended to cover any variations, uses, or adaptive changes of the present application that follow the general principles of the present application and include common knowledge or customary technical means in the technical field that are not yet applied for in the present application. The specification and embodiments are only considered exemplary, with a true scope and spirit of the present application being indicated by the claims.

In order to illustrate the technical solutions of the present application, specific embodiments are provided below.

A cooling tower is a device used to cool a cooling medium carrying waste heat, and the cooling medium is cooled and recycled by the cooling tower. The cooling medium cooled by the cooling tower is usually a liquid. For example, the cooling medium may be liquid water. As a cooling medium, water reduces the temperature of the cooled medium through processes, such as heat exchange, mass exchange, etc. The heat in the cooled medium is transferred to water, causing the water temperature to rise. The cooling tower may be used to cool the heated water. The water carrying waste heat exchanges heat and mass with the air in the cooling tower, thereby causing the water temperature to decrease. After the water carrying waste heat enters the cooling tower, it is usually sprayed to form water droplets on the fillings inside the cooling tower. The increased water surface area allows for better heat dissipation through a larger heat dissipation area, and the cooled water after heat dissipation may be collected and reused as a cooling medium.

However, since water in the cooling tower needs to be in contact with the air, in an environment with high sand content, it is inevitably that there be more accumulated sand inside the cooling tower. When water is cooled down in the cooling tower, accumulated sand in the cooling tower may be flushed by water and mixed with water, resulting in an excessive amount of sand carried in the cooled water, which does not meet the requirements for being used as a cooling medium again. Therefore, it is necessary to remove sand from the cooled water.

Sand removal device typically includes a self-cleaning sand filter or a mesh filter. Among them, the self-cleaning sand filter is composed of a plurality of standard high-speed sand tank units. Each sand tank unit is equipped with a water distributor and a water collector, and has a unique two-way automatic flushing valve, which can realize separate back-washing of the plurality of standard high-speed sand tank units one by one in normal system operation. The mesh filter is usually installed at an inlet end of a pressure reducing valve, a pressure relief valve, a constant water level valve or other equipment to remove impurities in the medium so as to protect the normal use of valves and equipment. When a fluid enters the filter cartridge equipped with a filter screen of a certain specification, its impurities are blocked, and the cleaned filtrate is discharged through a filter outlet.

However, the water consumption of a self-cleaning sand filter is too large during the sand removal process, and there are problems with sewage discharge after sand removal. Moreover, since both the self-cleaning sand filter and the mesh filter remove sand by extracting cooling water mixed with sand, the existing sand removal methods cannot remove sand if there is accumulated sand precipitated at the bottom thereof after collection of cooling water, resulting a poor sand removal effect.

In order to solve the above problems, embodiments of the present application provide a sand removal device for a cooling tower and a cooling tower structure. FIG. 1 is a structural schematic diagram of a sand removal device for a cooling tower in an embodiment of the present application. Referring to FIG. 1, a sand removal device 10 may include: a flushing assembly 11 and a cyclone sand removal assembly 12. The flushing assembly 11 includes a first pipeline 111 having a plurality of water outlets. The first pipeline 111 is used to spray liquid towards a bottom of a cooling tower 20 through the plurality of water outlets. The cyclone sand removal assembly 12 is used to extract the liquid at the bottom of the cooling tower 20, perform sand removal treatment on the liquid, and then discharge the liquid in which sand is removed into the bottom of the cooling tower 20. Where, the bottom of the cooling tower 20 may include an accommodating space 21 which is capable of storing liquid.

It should be noted that the accommodating space 21 can collect and store liquid cooled by the cooling tower 20. For example, when the liquid described above is water, the accommodating space 21 may be a water collection tank for storing water cooled by the cooling tower 20.

In some embodiments, the plurality of water outlets in the first pipeline 111 may be in any shape, such as circular, diamond, etc. The shapes of the plurality of water outlets may be the same or different, as long as the liquid in the first pipeline 111 may be ejected from respective water outlets.

In some embodiments, the number and distribution of water outlets may be set based on actual needs. For example, water outlets may be arranged with equal distances from each other in the first pipeline 111. Alternatively, the number and distribution of water outlets may be arranged according to the shape of the first pipeline 111. For example, when the first pipeline 111 has bending portions, more water outlets are provided in the bending portions, and relatively fewer water outlets are provided in other portions.

In some embodiments, the liquid may be any liquid that needs to be cooled, for example, the liquid may be water, saline water, mechanical oil, etc. as a cooling medium. Hereinafter, a sand removal device 10 provided by an embodiment of the present application is described with the liquid as water that serves as a cooling medium for an example.

It can be understood that a cooling tower is a facility used to cool down the heated water, and the cooled water is collected at the bottom of the cooling tower and may continue to be recycled as a cooling medium. In an environment with a high sand content, there is a high sand content in the air. Due to the direct contact between the cooling tower and the air, there may also be a large amount of accumulated sand inside the cooling tower. When the heated water is cooled down through the cooling tower, it may bring the sand contained in the air and the accumulated sand inside the cooling tower out, resulting in an excessive amount of sand in the cooled water, which does not meet the requirements for the cooled water being used as a cooling medium again. Therefore, it is necessary to remove sand from the cooled water.

In an embodiment of the present application, cooled water is collected at the bottom of a cooling tower. When using a sand removal device 10 to remove sand from the water at the bottom of the cooling tower, a first pipeline 111 in a flushing assembly 11 may extract the water at the bottom of the cooling tower, and the first pipeline 111 sprays water towards the bottom of the cooling tower through a plurality of openings in the pipeline to flush up sand deposited at the bottom of the cooling tower, so that sand may be fully mixed with water. The cyclone sand removal assembly 12 extracts the mixed water and removes sand from it, and then discharges the sand-removed water into the bottom of the cooling tower, so that the water in which sand is removed may continue to be recycled as a cooling medium.

In some embodiments, during the process of removing sand from liquid at the bottom of a cooling tower by a sand removal device 10, the sequence of the process of spraying liquid towards the bottom of the cooling tower through a plurality of water outlets in the first pipeline 111 and the process of extracting liquid from the bottom of the cooling tower and performing sand removal treatment by the cyclone sand removal assembly 12 may be unrestricted. For example, in a case in which liquid is water for an example, the way that the sand removal device 10 removes sand from the water at the bottom of the cooling tower may be that: the flushing assembly 11 first uses the water at the bottom of the cooling tower to flush the bottom of the cooling tower (the first pipeline 111 sprays water towards the bottom of the cooling tower through a plurality of openings in the pipeline), thereby flushing the sand at the bottom of the cooling tower and fully mixing the sand with water. The cyclone sand removal assembly 12 extracts the mixed water to remove sand, and discharges the sand-removed water into the bottom of the cooling tower. Alternatively, the way that the sand removal device 10 removes sand from the water at the bottom of the cooling tower may be: first performing a sand removal treatment by the cyclone sand removal assembly 12 and then discharging the sand-removed water into the bottom of the cooling tower. Afterwards, the flushing assembly 11 extracts the sand-removed water, and then sprays water towards the bottom of the cooling tower through a plurality of water outlets in the first pipeline 111, thereby flushing the accumulated sand at the bottom of the cooling tower and fully mixing the sand with water. The cyclone sand removal assembly 12 extracts the mixed water for another sand removal treatment, and discharges the sand-removed water again into the bottom of the cooling tower.

In some embodiments, in order to improve the sand removal effect of a sand removal device 10, the sand removal device 10 may also perform a sand removal treatment to the liquid at the bottom of a cooling tower multiple times.

Where the specific number of times for the sand removal device 10 to remove sand from the liquid at the bottom of the cooling tower may be specifically determined based on the actual situation. For example, the sand removal device 10 may remove sand from the liquid at the bottom of the cooling tower for a certain number of times. Alternatively, the number of times for the sand removal device 10 to remove sand from the liquid at the bottom of the cooling tower may also be determined based on the effect of the sand removal device 10 after each sand removal.

In an embodiment of the present application, the first pipeline 111 sprays liquid towards the bottom of the cooling tower through the plurality of water outlets, which can flush the bottom of the cooling tower, stir the sand evenly at the bottom of the cooling tower, and when the liquid at the bottom of the cooling tower is extracted by a cyclone sand removal assembly 12 for sand removal, the sand deposited at the bottom of the cooling tower may be smoothly extracted, which can improve the effect of sand removal. At the same time, the cyclone sand removal assembly 12 removes sand from the liquid and then the liquid is discharged into the bottom of the cooling tower. The first pipeline 111 uses the liquid at the bottom of the cooling tower to flush the bottom of the cooling tower, achieving the recycling of liquid and reducing water consumption.

In some possible implementations, a first pipeline 111 is arranged at and around the bottom of the cooling tower.

It can be understood that the first pipeline 111 is used to spray liquid outwards through the plurality of water outlets in the pipeline, so as to flush the accumulated sand at the bottom of the cooling tower. Therefore, the first pipeline 111 is arranged to surround the bottom of the cooling tower. The first pipeline 111 may achieve flushing the bottom of the cooling tower in each direction, improving the flushing effect, so that the accumulated sand at the bottom of the cooling tower may be fully mixed with the liquid. When the liquid at the bottom of the cooling tower is extracted for sand removal by the cyclone sand removal assembly 12, the sand deposited at the bottom of the cooling tower may be smoothly extracted, thereby improving the sand removal effect on the liquid.

Figure 2A:
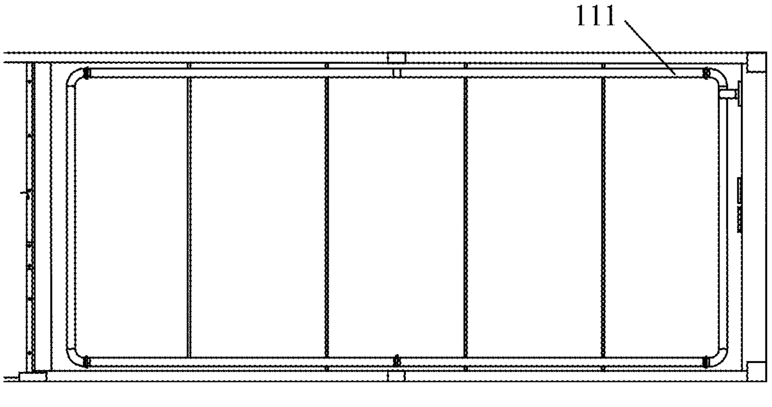
FIG. 2*a* is a structural schematic diagram of a first pipeline in an embodiment of the present application.
Figure 2B:
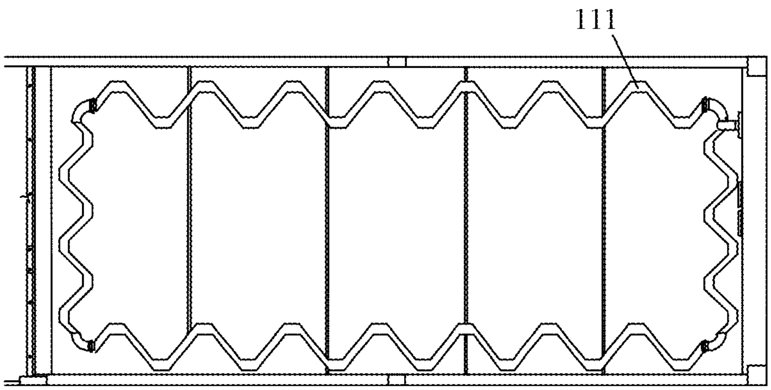
FIG. 2*b* is another structural schematic diagram of a first pipeline in an embodiment of the present application.
Figure 2C:
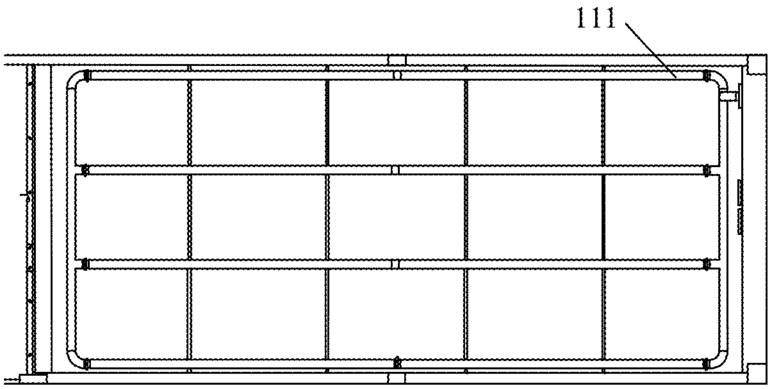
FIG. 2*c* is still another structural schematic diagram of a first pipeline in an embodiment of the present application.

In an embodiment of the present application, the first pipeline 111 may be arranged at the bottom of the cooling tower in any structural form, and may at least surround the bottom of the cooling tower for a circumference. Referring to FIG. 2*a* to FIG. 2*c*, FIG. 2*a* to FIG. 2*c* are structural schematic diagrams of a first pipeline 111 surrounding the bottom of a cooling tower in an embodiment of the present application. Where, FIG. 2*a* is a structural schematic diagram of a first pipeline 111 in an embodiment of the present application being a straight pipe and arranged around the bottom of the cooling tower. FIG. 2*b* is a structural schematic diagram of a first pipeline 111 in an embodiment of the present application being a curved pipe and arranged around the bottom of the cooling tower. FIG. 2*c* is a structural schematic diagram of a first pipeline 111 in an embodiment of the present application being a straight pipe with a plurality of branches and arranged around the bottom of the cooling tower, in which the branches are connected together through tee structures.

In FIG. 2*a* to FIG. 2*c*, there are bending portions of the first pipeline 111 when the first pipeline 111 is disposed at the bottom of the cooling tower. At this time, the first pipeline 111 having the bending portions may be integrally formed, or may be formed by connecting a plurality of pipeline sections together through dual-pass structures. For example, when the first pipeline 111 is a pipeline formed integrally, the first pipeline 111 may have structures of corresponding bending portions during production, or the first pipeline 111 may also be a pipeline selected with inherent bending characteristics.

In some embodiments, there is a gap between the first pipeline 111 and the bottom of the cooling tower.

It can be understood that when the cyclone sand removal assembly 12 extracts liquid at the bottom of the cooling tower through a pipe for sand removal treatment, the water pumping pipe of the cyclone sand removal assembly 12 needs to be close to the bottom of the cooling tower in order to fully extract the liquid at the bottom of the cooling tower. If the first pipeline 111 is close to the bottom of the cooling tower without any gaps, when the water pumping pipe extracts the liquid at the bottom of the cooling tower, part of the liquid may be blocked by the first pipeline, and the cyclone sand removal assembly 12 cannot fully extract the liquid, causing the sand in this part of the liquid cannot be removed, which affects the overall sand removal effect of the sand removal device 10. A gap is provided between the first pipeline 111 and the bottom of the cooling tower, and the sand and liquid deposited at the bottom of the cooling tower can be extracted by the cyclone sand removal assembly 12 through the gap, which can improve the effect of sand removal.

In some embodiments, when there is a gap between the first pipeline 111 and the bottom of the cooling tower, in order to ensure the stability of the first pipeline 111, a plurality of support rods may be provided between the first pipeline 111 and the bottom of the cooling tower.

Figure 2D:
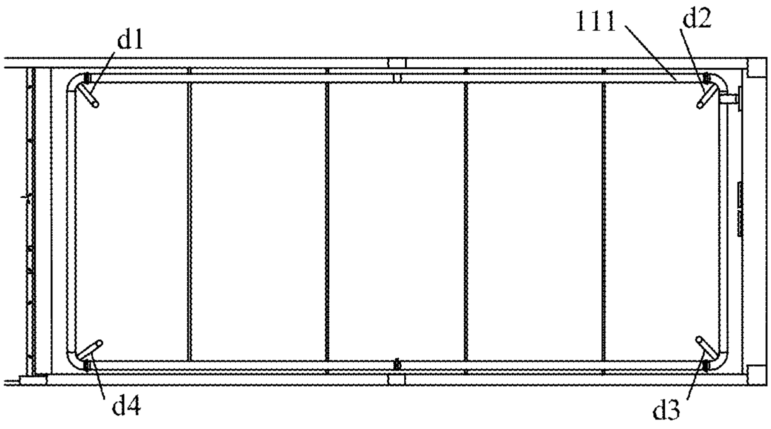
FIG. 2*d* is still another structural schematic diagram of a first pipeline in an embodiment of the present application.

Exemplarily, FIG. 2*d* shows a structural schematic diagram of a first pipeline 111 provided with support rods in an embodiment of the present application. Referring to FIG. 2*d*, there are four bending portions of the first pipeline 111, and each bending portion is provided with a support rod, respectively d1, d2, d3 and d4 in FIG. 2*d*, the support rods are used to support the first pipeline 111 to be fixed above the bottom of the cooling tower.

It should be noted that the position and number of support rods may be selected based on actual needs, which is not specifically limited in the embodiments of the present application.

In an embodiment of the present application, the first pipeline 111 in the flushing assembly 11 sprays liquid through a plurality of water outlets to flush the accumulated sand at the bottom of the cooling tower. In order to increase the flushing force of the liquid on the bottom of the cooling tower and further improve the flushing effect of the liquid on the accumulated sand at the bottom of the cooling tower, the flushing assembly 11 may also include: a first circulation pump and a second pipeline.

It should be noted that the first circulation pump may be a mechanical device capable of transporting liquid and pressurizing the liquid. Its principle is that the mechanical energy or other external energy of the device is transmitted to the liquid, increasing the energy of the liquid. In a case where the above liquid is water for an example, the first circulation pump may be any type of water pump, such as a vane pump, a positive displacement pump, a reciprocating pump, etc. The second pipeline may be used as a water pumping pipe of the first circulation pump to pump the water stored at the bottom of the cooling tower into the first circulation pump.

Figure 3:
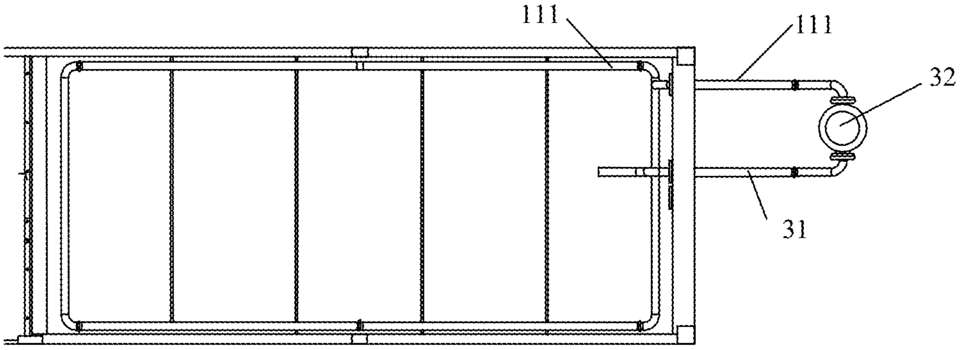
FIG. 3 is a structural schematic diagram of a flushing assembly in an embodiment of the present application.

Exemplarily, FIG. 3 is a structural schematic diagram of a flushing assembly 11 in an embodiment of the present application. Referring to FIG. 3, the flushing assembly 11 is composed of a first pipeline 111, a second pipeline 31 and a first circulation pump 32 respectively. The second pipeline 31 is connected to the inlet of the first circulation pump 32, and the first pipeline 111 is connected to the outlet of the first circulation pump 32. The first circulation pump 32 extracts the liquid at the bottom of the cooling tower through the second pipeline 31. After the liquid is energized by the first circulation pump 32, it is transported to the first pipeline 111, and the first pipeline 111 sprays the liquid towards the bottom of the cooling tower through a plurality of water outlets in the pipeline.

It can be understood that the first circulation pump 32 can increase the energy of the liquid flowing through it. Therefore, by arranging the first circulation pump 32 to energize the liquid, the liquid in the first pipeline 111 has higher energy. The higher the energy of the liquid, the higher the flushing force it has when sprayed towards the bottom of the cooling tower through a plurality of water outlets, thereby having a better flushing effect on the accumulated sand at the bottom of the cooling tower, and making the liquid at the bottom of the cooling tower fully mixed with the accumulated sand. Furthermore, when the liquid at the bottom of the cooling tower is extracted by the cyclone sand removal assembly 12, the accumulated sand at the bottom of the cooling tower can be extracted as much as possible, thereby improving the sand removal effect.

In some possible implementations, a plurality of water outlets in the first pipeline 111 face the bottom of the cooling tower and have oblique angles in the vertical direction relative to the bottom of the cooling tower.

It can be understood that the water outlets in the first pipeline 111 is used to flush the accumulated sand at the bottom of the cooling tower by spraying the liquid outwards, so that the liquid and the accumulated sand at the bottom of the cooling tower are stirred and mixed together. In order to prevent the accumulated sand from depositing too quickly, it is necessary to make the liquid flow fully at the bottom of the cooling tower. At the same time, the liquid that fully flows may also drive the accumulated sand that has not been flushed. For example, liquid sprays out from the water outlets, driving the liquid at the bottom of the cooling tower to form a cyclone, thereby driving the unflushed accumulated sand to mix with the liquid together. Arranging the water outlets in the first pipeline 111 facing the bottom of the cooling tower at a certain oblique angle in the vertical direction, the water sprayed from the water outlets has higher power, compared with the configuration of arranging the direction of water outlets in the vertical direction directly facing the bottom of the cooling tower, making the liquid at the bottom of the cooling tower have higher flowing capacity, so that when the cyclone sand removal assembly 12 extracts the mixed liquid, more accumulated sand can be extracted, thereby improving the sand removal effect.

Figure 4A:
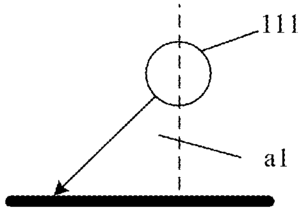
FIG. 4*a* is a side view of the directions of a plurality of water outlets in an embodiment of the present application.
Figure 4B:
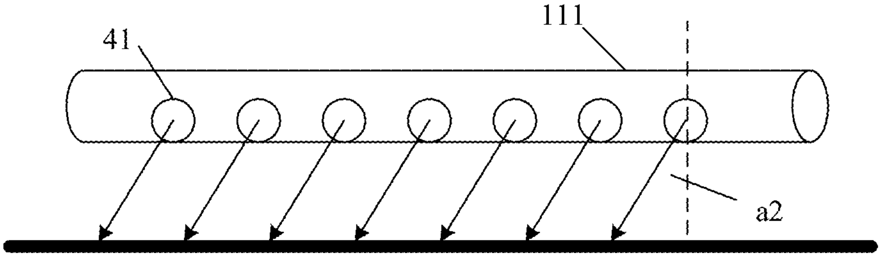
FIG. 4*b* is a main view of the directions of a plurality of water outlets in an embodiment of the present application.

In some embodiments, the size of the oblique angle may be selected according to actual application requirements. For example, according to the maximum force at 45° from the vertical direction, the directions of the a plurality of water outlets in an embodiment of the present application may be oblique angles of 45° from the vertical direction of the bottom of the cooling tower which all face the center direction of the bottom of the cooling tower. Referring to FIG. 4*a* and FIG. 4*b*, FIG. 4*a* and FIG. 4*b* are schematic diagrams which show a water outflow direction of a plurality of water outlets 41 in the first pipeline 111 in an embodiment of the present application, when there is an oblique angle of 45° from the vertical direction of the bottom of the cooling tower. Among them, FIG. 4*a* is a side view of the direction of a plurality of water outlets, and FIG. 4*b* is a front view of the water outflow direction. The oblique angle a1 and the oblique angle a2 are both the oblique angles between the water outflow direction of the water outlets and the vertical direction of the bottom of the cooling tower, and a1 and a2 are both 45°.

In some embodiments, the first pipeline 111 may rotate periodically at the bottom of the cooling tower. For example, also referring to the structural schematic diagram of the first pipeline 111 shown in FIG. 2*a*, four bending portions of the first pipeline 111 may include self-rotating assemblies respectively. When the flushing assembly 11 is working, the four rotating assemblies may drive the first pipeline 111 to self-rotate periodically. At this time, the size of the oblique angle may change periodically as the first pipeline 111 rotates.

In other embodiments, a plurality of water outlets 41 may be separate components disposed on the first pipeline 111. When the flushing assembly 11 is working, the water outlets 41 may rotate periodically on the first pipeline 111. At this time, the size of the oblique angle may also change periodically with the rotation of the water outlets 41.

It can be understood that the first pipeline 111 is arranged around the bottom of the cooling tower, and the first pipelines 111 arranged on both sides of the center of the bottom of the cooling tower are opposite to each other relative to the center of the bottom of the cooling tower. For example, also referring to the structural schematic diagram of the first pipeline 111 shown in FIG. 2*a*, with respect to the center of the bottom of the cooling tower, the first pipelines 111 provided in four directions at the bottom of the cooling tower are arranged opposite to each other between pairs of the first pipelines. If a plurality of water outlets in the first pipeline 111 all face the center direction of the bottom of the cooling tower, then the directions of the a plurality of water outlets on the opposite first pipeline 111 are completely opposite. In order to avoid the mutual counteraction of acting forces of liquid when sprayed outwards from a plurality of water outlets in the first pipeline 111 due to the plurality of water outlets have opposite directions, the water outlets in the first pipelines 111 which are arranged opposite to each other may be set in a staggered manner, so that there is no intersection between the directions of liquid when sprayed out of the water outlets in the first pipelines 111 opposite to each other.

Figure 5:
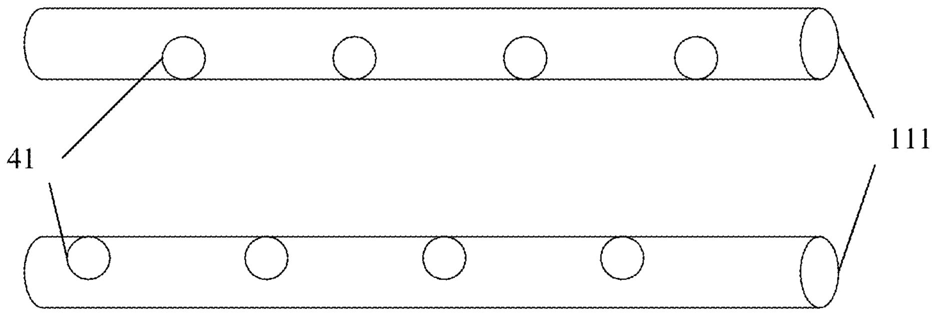
FIG. 5 is a structural schematic diagram of first pipelines arranged in the opposite directions in an embodiment of the present application.

Exemplarily, FIG. 5 is a structural schematic diagram of first pipelines 111 arranged opposite to each other in an embodiment of the present application. As shown in FIG. 5, the first pipelines 111 include a plurality of water outlets 41, and respective water outlets 41 provided in the first pipelines 111 opposite to each other are arranged in a staggered manner. Where, the directions of the plurality of water outlets face the center direction of the bottom of the cooling tower, and have oblique angles of 45° from the vertical direction of the bottom of the cooling tower. In this way, there is no intersection between the directions of liquid when sprayed through the water outlets in opposite directions, which does not cause the mutual counteraction of acting forces, so that the sand and liquid can be fully mixed, and the sand removal effect is improved.

Figure 6:
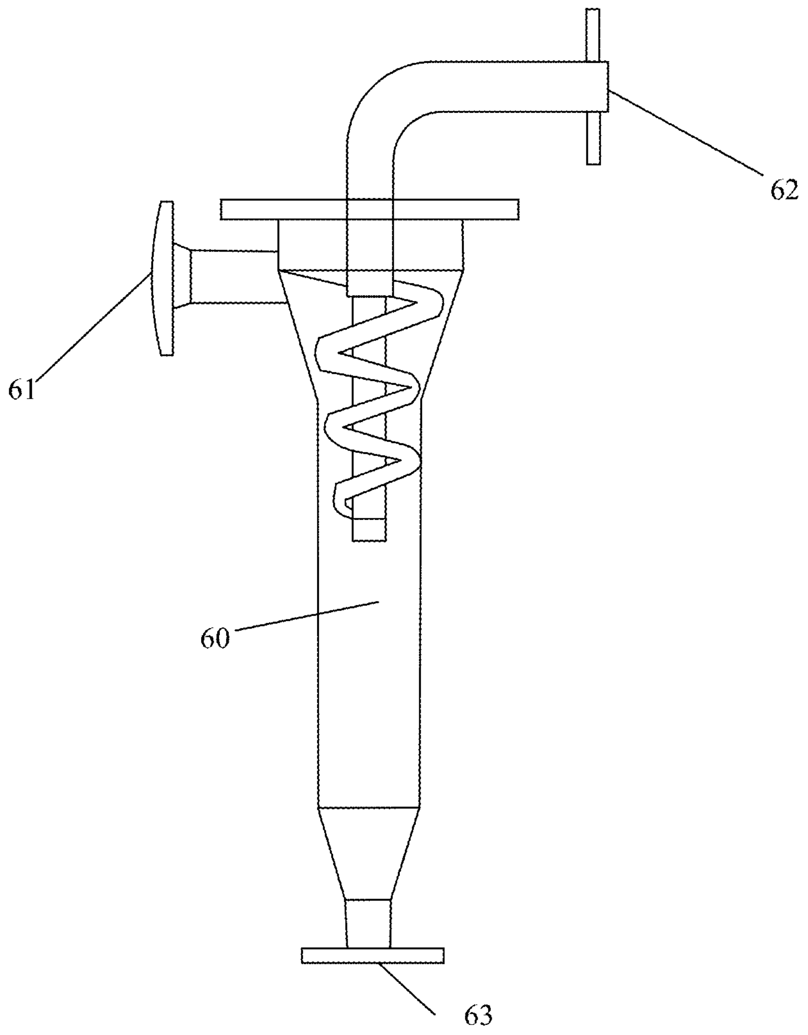
FIG. 6 is a structural schematic diagram of a cyclone sand removal assembly in an embodiment of the present application.

In some embodiments, the cyclone sand removal assembly 12 may be any type of cyclone sand remover. The cyclone sand remover is made according to the screening principle of solid particles in the fluid when the solid particles rotate and flow in the sand remover, in combination with a filtration device to form a new separation device. When the water flow is under a certain pressure, and water having different densities from which sand is to be removed undergoes the combined action of centrifugal force and centripetal force, the water with low density rises and is discharged through a water outlet, and sand with high density is discharged from the bottom of the device. Several tiny particles that float together along the water flow are then filtered by a second-stage filtration device to achieve the purpose of sand removal. It has the advantages of high sand removal rate, saving installation space, low rate of missing the capture of several tiny particles, and stable working condition. Referring to FIG. 6, FIG. 6 is a schematic diagram of the sand removal principle of the cyclone sand removal assembly 12 in an embodiment of the present application. The cyclone sand removal assembly 12 includes a cyclone sand removal assembly main body 60, a water inlet 61, a water outlet 62 and a sand outlet 63. A liquid enters the cyclone sand removal assembly main body 60 tangentially from the water inlet 61, the liquid generates strong rotational motion. Under the combined action of centrifugal force, centripetal force, buoyancy and fluid drag, liquid with low density rises and is discharged out of the main body 60 through the water outlet 62, and sand with high density is discharged out of the main body 60 through the sand outlet 63.

In some possible implementations, a cyclone sand removal assembly 12 may further include: a third pipeline, a fourth pipeline, and a second circulation pump.

Among them, the second circulation pump is connected to the bottom of the cooling tower and the water inlet of the cyclone sand removal assembly respectively through the third pipeline. The second circulation pump is used to extract the liquid at the bottom of the cooling tower through the third pipeline, and convey the liquid to the water inlet of the cyclone sand removal assembly. The fourth pipeline is connected to the water outlet of the cyclone sand removal assembly and the bottom of the cooling tower respectively, and is used to discharge the sand-removed liquid into the bottom of the cooling tower.

It should be noted that the second circulation pump may also be a mechanical device capable of transporting liquid and pressurizing the liquid. The second circulation pump and the first circulation pump may be the same or different. For instance, in a case where liquid is water for an example, the second circulation pump may be the same water pump as the first circulation pump or the different water pump from the first circulation pump, for example, a vane pump, a positive displacement pump, a reciprocating pump, etc.

It can be understood that, in a case where the cyclone sand removal assembly 12 is a cyclone sand removal device for an example, when it removes sand from liquid, the liquid enters the main body 60 tangentially from the water inlet 61 and generates rotational motion in the main body 60 to achieve sand removal. Within a certain range and conditions, the greater the pressure of the liquid entering the main body 60, the stronger the rotational movement of the liquid in the main body 60, and the higher the sand removal efficiency. Therefore, by providing the second circulation pump, the pressure of the liquid entering the main body 60 can be increased and the sand removal efficiency can be improved.

In some possible implementations, a connection point between a fourth pipeline and the bottom of the cooling tower is higher than the liquid level of the liquid at the bottom of the cooling tower.

It can be understood that the liquid after sand removal is discharged from the water outlet 62 of the cyclone sand removal assembly 12 into the bottom of the cooling tower through the fourth pipeline. If the connection position between the fourth pipeline and the bottom of the cooling tower is lower than the liquid level when the liquid is at the bottom of the cooling tower, a siphon phenomenon may occur due to the pressure difference, which may cause the liquid at the bottom of the cooling tower to directly flow back from the fourth pipeline into the main body 60 of the cyclone sand removal assembly 12, affecting the sand removal of the cyclone sand removal assembly 12. Therefore, setting the connection point between the fourth pipeline and the bottom of the cooling tower to be higher than the liquid level may avoid the situation in which the liquid at the bottom of the cooling tower from directly flows back from the fourth pipeline into the main body 60 of the cyclone sand removal assembly 12, thereby improving the sand removal efficiency.

Figure 7:
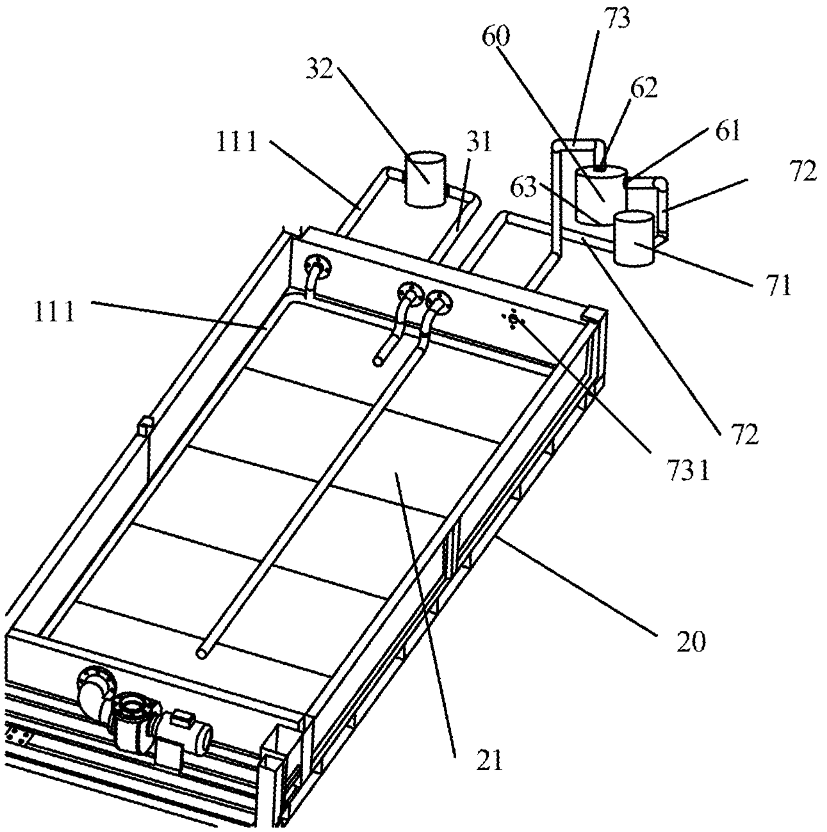
FIG. 7 is a structural schematic diagram of a cyclone sand removal assembly in an embodiment of the present application.

Exemplarily, FIG. 7 shows a structural schematic diagram of a cyclone sand removal assembly 12 in an embodiment of the present application. Referring to FIG. 7, the second circulation pump 71 is connected to the bottom of the cooling tower and the water inlet 61 of the cyclone sand removal assembly 12 respectively through a third pipeline 72. The fourth pipeline 73 is connected to the water outlet 62 of the cyclone sand removal assembly 12 and the bottom of the cooling tower respectively. Where, one end of the third pipeline 72 at the bottom of the cooling tower is tightly attached to the bottom of the cooling tower, and the connection point 731 between the fourth pipeline 73 and the bottom of the cooling tower is higher than the liquid level of the liquid at the bottom of the cooling tower.

In some embodiments, in order to facilitate the handling of the accumulated sand discharged from the sand outlet 63 after the cyclone sand removal assembly 12 performs sand removal operation, a sand storage assembly may be provided at the sand outlet 63 to collect the accumulated sand discharged from the cyclone sand removal assembly 12.

Figure 8:
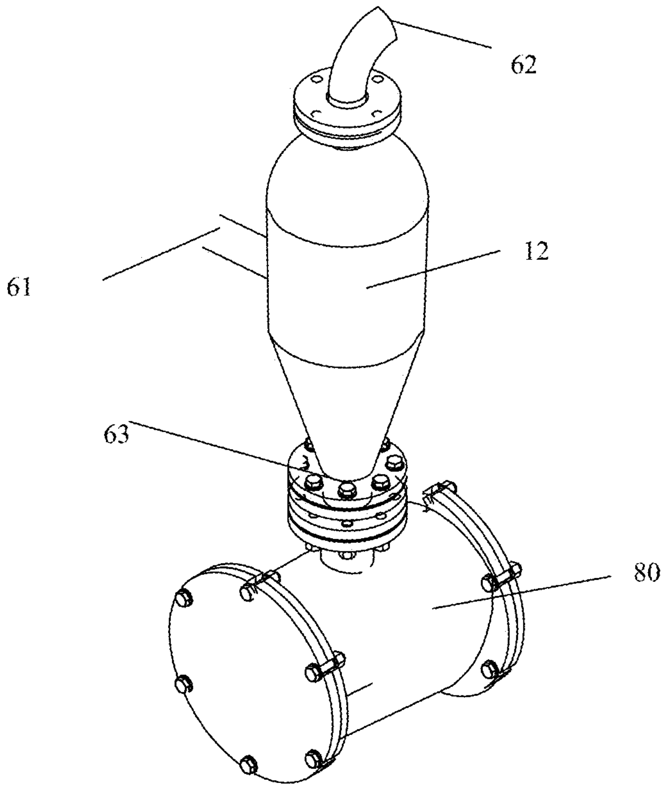
FIG. 8 is a structural schematic diagram of a cyclone sand removal assembly connected to a sand storage assembly in an embodiment of the present application.

FIG. 8 is a structural schematic diagram of a cyclone sand removal assembly 12 connected to a sand storage assembly in an embodiment of the present application. As shown in FIG. 8, the sand outlet 63 of the cyclone sand removal assembly 12 is connected to the sand storage assembly 80. The sand storage assembly is used to store the accumulated sand discharged after the cyclone sand removal assembly 12 performs a sand removal treatment on the liquid.

In some embodiments, the sand storage assembly 80 may be detachably connected to the sand outlet 63.

It can be understood that after the accumulated sand is stored in the sand storage assembly 80 to a certain amount, it is necessary to clean the accumulated sand. The sand storage assembly 80 is detachably connected to the sand outlet 63, so that when the accumulated sand needs to be cleaned, the entire sand storage assembly 80 can be directly detached to facilitate quick cleaning of the accumulated sand. At the same time, the sand storage assembly 80 may further be replaced by one of the same specification, reducing the time it takes for the cyclone sand removal assembly 12 to stop working due to cleaning the accumulated sand.

In some possible implementations, the sand storage assembly 80 includes at least one opening. And each opening is provided with a cover plate for opening or closing the opening. When the opening is open, the accumulated sand in the sand storage assembly 80 can be taken out of the sand storage assembly 80 through the opening.

It can be understood that an opening is provided on the sand storage assembly 80, and when cleaning the accumulated sand in the sand storage assembly 80, the operation can be performed directly through the opening without detaching the entire sand storage assembly 80. In this way, it not only facilitates the process of handling the accumulated sand in the sand storage assembly 80, but also prevents the cyclone sand removal assembly 12 from being unable to work continuously due to the detaching of the sand storage assembly 80.

In some embodiments, when there are a plurality of openings in the sand storage assembly 80, the specifications of the plurality of openings may be the same.

It can be understood that by setting the specifications of the plurality of openings to be the same, cover plates on respective openings may be shared with each other. In this way, when replacing cover plates on respective openings, replacement cover plates may be selected based on a unified standard, thereby reducing replacement costs. At the same time, when closing a plurality of openings, there is no need to confirm respective openings and corresponding cover plates, which also facilitates the use of the cover plates.

In some embodiments, a cover plate and an opening may be movably connected, or the cover plate and the opening may also be fixedly connected. For example, when the cover plate and the opening are movably connected, the connection between the cover plate and the opening may be achieved by a plurality of hinges. When the hinges are opened, the opening is open; when the hinges are closed, the opening is closed by the cover. When the cover plate and the opening are fixedly connected, the cover plate and the opening may be connected together by a plurality of bolts. When the opening needs to be opened, the cover plate is removed from the opening by removing the bolts, so as to open the opening.

In some possible implementations, the sand storage assembly 80 is provided with a holding structure, and the holding structure is used to hold accumulated sand. Where, the outer diameter of the holding structure may be set smaller than the inner diameter of the opening.

It can be understood that the situation, in which the outer diameter of the holding structure is set to be smaller than the inner diameter of the opening, can make the holding structure taken out of the sand storage assembly 80 through the opening. In this way, when the accumulated sand in the sand storage assembly 80 needs to be cleaned, there is no need to detach the entire sand storage assembly 80, which facilitates the process of handling the accumulated sand in the sand storage assembly 80.

It can be understood that after the cyclone sand removal assembly 12 removes sand from the liquid, the accumulated sand is discharged through the sand outlet 63, a part of the liquid maybe discharged through the sand outlet 63 at the same time and enters the holding structure of the sand storage assembly. Therefore, in order to reduce the space of the holding structure occupied by the liquid, in some embodiments, the holding structure may be provided with a plurality of through-holes. The liquid entering the holding structure may be discharged through the through-holes, while the accumulated sand stored in the holding structure does not leak out of the holding structure through the through-holes.

Figure 9:
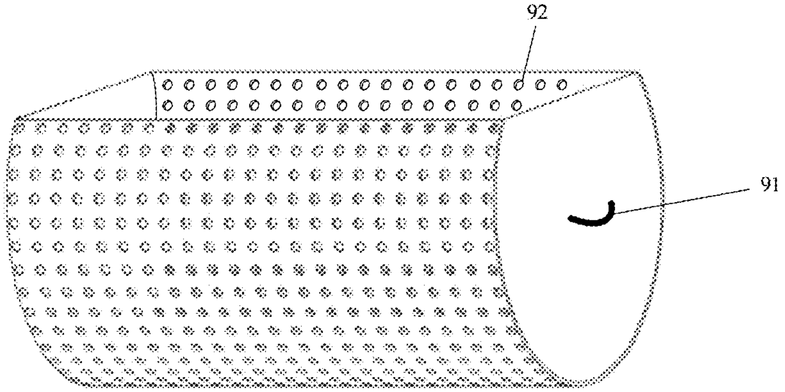
FIG. 9 is a structural schematic diagram of a holding structure in an embodiment of the present application.

FIG. 9 is a structural schematic diagram of a holding structure in an embodiment of the present application. As shown in FIG. 9, the holding structure 90 is provided with a handle 91 and a plurality of through-holes 92.

Where, the handle 91 may be used as a supporting structure of the holding structure 90 for lifting the holding structure. The through-holes 92 in the holding structure 90 is used to discharge liquid carried when accumulated sand is discharged through the sand outlet 63.

In some embodiments, liquid in the holding structure may enter the space of the entire sand storage assembly 80 after being discharged through the through-holes. In order to discharge liquid entering the sand storage assembly 80, the sand storage assembly 80 may also be provided with a discharge structure.

It can be understood that, in a case where liquid is water for an example, after the cyclone sand removal assembly 12 performs a sand removal operation on water, accumulated sand is discharged through the sand outlet 63, but there is still some water being discharged through the sand outlet 63 together with accumulated sand. After accumulated sand is stored by the holding structure as shown in FIG. 9, this part of water flows out of the holding structure through the through-holes into the sand storage assembly 80. In order to discharge this part of water out of the sand storage assembly 80, the water entering the sand storage assembly 80 may be discharged out of the sand storage assembly 80 by disposing a discharge structure on the sand storage assembly 80.

Exemplarily, the discharge structure may be a plurality of through-holes arranged at the bottom of the sand storage assembly 80; or the discharge structure may also be a faucet device, a ball valve device, etc., which is arranged at the bottom of the sand storage assembly 80; or the discharge structure may also be a device capable of extracting liquid which is arranged at any position of the sand storage assembly 80. In summary, the discharge structure may be any structure that can control the discharge of liquid out of the sand storage assembly 80, which is not specifically limited in the embodiments of the present application.

In some possible implementations, in order to visually display the amount of accumulated sand in the sand storage assembly 80 and determine the time when it is necessary to clean up the accumulated sand in the sand storage assembly, a visual window may be provided on the sand storage assembly 80 to display the amount of accumulated sand in the sand storage assembly 80.

Where, the visual window may be a cover plate made of a transparent material. For example, the material used for making the visual window may be glass, an acrylic plate, etc.

It can be understood that in order to fully display the amount of accumulated sand in the sand storage assembly 80, the visual window may be arranged at a position on the top of the sand storage assembly 80 near the sand outlet 63.

In some embodiments, when accumulated sand in the sand storage assembly 80 needs to be cleaned, the cyclone sand removal assembly 12 needs to be suspended, which affects the sand removal efficiency. In order to ensure the continuous operation of the cyclone sand removal assembly 12, a ball valve assembly may be arranged between the cyclone sand removal assembly 12 and the sand storage assembly 80 to control the communication between the cyclone sand removal assembly 12 and the sand storage assembly 80.

Figure 10:
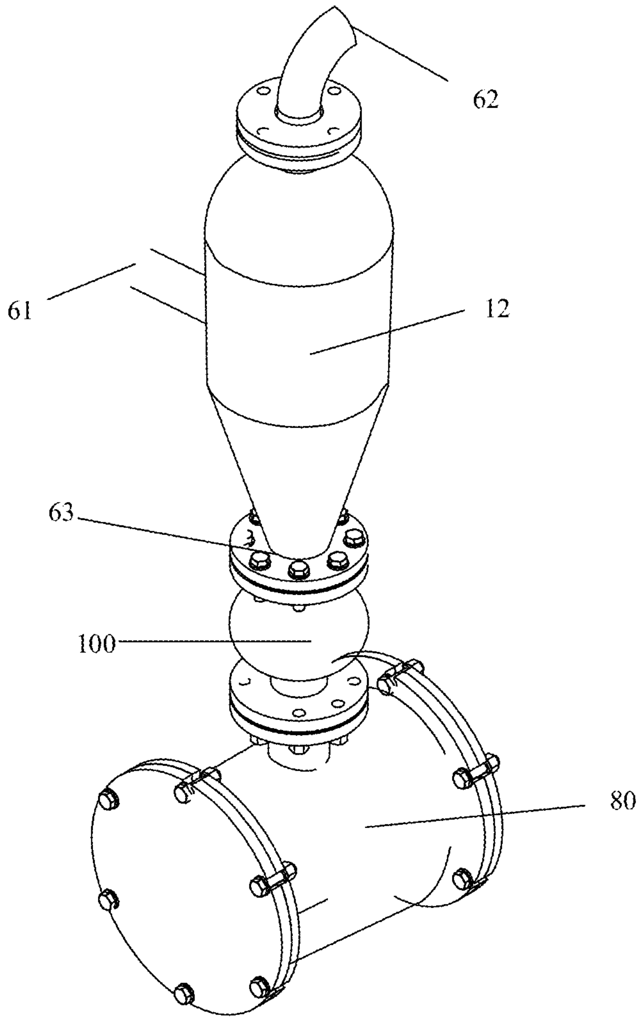
FIG. 10 is another structural schematic diagram of a cyclone sand removal assembly in an embodiment of the present application.

FIG. 10 is another structural schematic diagram of a cyclone sand removal assembly 12 in an embodiment of the present application. As shown in FIG. 10, the cyclone sand removal assembly 12 further includes a ball valve assembly 100. The ball valve assembly 100 is arranged between the sand outlet 63 of the cyclone sand removal assembly 12 and the sand storage assembly 80.

In an embodiment of the present application, the ball valve assembly 100 is used to control the communication between the sand outlet 63 and the sand storage assembly 80. When accumulated sand in the sand storage assembly 80 needs to be cleaned, the ball valve assembly 100 may be closed to allow the accumulated sand discharged through the sand outlet 63 to fall into the ball valve assembly 100 temporarily. At this time, the cyclone sand removal assembly 12 may continue to work. After accumulated sand in the sand storage assembly 80 is cleaned, the ball valve assembly 100 is opened. In this way, the cyclone sand removal assembly 12 can continue working during the process in which accumulated sand in the sand storage assembly 80 is being cleaned, ensuring the sand removal efficiency.

It should be noted that the ball valve assembly 100 may be a ball valve of any specification, for example, a ball valve of DN80 or DN25. Specific specifications of the ball valve may be selected based on actual needs, which is not limited in the embodiments of the present application.

Based on the same concept, an embodiment of the present application also provides a cooling tower structure, which includes: a cooling tower and the above-described sand removal device 10 for the cooling tower. Where, the sand removal device 10 is used to remove sand from liquid at the bottom of the cooling tower.

For example, still referring to FIG. 1, the bottom of the cooling tower 20 has an accommodating space 21 capable of collecting and storing liquid cooled by the cooling tower 20. In a case where liquid is water for an example, the accommodating space 21 may be a water collection tank for storing water cooled by the cooling tower 20.

In an embodiment of the present application, first pipelines 111 spray liquid into the accommodating space 21 at the bottom of the cooling tower 20 through a plurality of water outlets, which can evenly stir sand in the accommodating space 21 at the bottom of the cooling tower 20. When the cyclone sand removal assembly 12 extracts liquid in the accommodating space 21 at the bottom of the cooling tower 20 for sand removal, the sand accumulated in the accommodating space 21 can be smoothly extracted. At the same time, the liquid is discharged into the accommodating space 21 after subjected to sand removal by the cyclone sand removal assembly 12. The first pipelines 111 use the liquid in the accommodating space 21 to flush the accommodating space 21, thereby realizing the recycling of the liquid. In this way, the sand removal effect on liquid is improved while water consumption is reduced.

Those skilled in the art can understand that the size of serial numbers of respective steps in the above embodiments does not imply the order of execution. The execution order of respective processes should be determined by their function and internal logic, and should not constitute any limitation on the implementation process of the embodiments of the present application.

The above-described embodiments are only used to illustrate the technical solutions of the present application, but not to limit them. Although the present application has been described in detail with reference to the aforementioned embodiments, it should be understood by persons skilled in the art that the technical solutions recorded in the aforementioned embodiments may still be modified or some or all of the technical features of the technical solutions may be equivalently substituted; while these modifications or substitutions do not depart the essence of the corresponding technical solutions from the spirit and scope of the various embodiments of the present application, and should be included in the protection scope of the present application.

What is claimed is:

1. A sand removal device for a cooling tower, comprising a flushing assembly and a cyclone sand removal assembly;
- wherein the flushing assembly comprises a first pipeline having a plurality of water outlets, and the first pipeline is configured to spray liquid towards a bottom of the cooling tower through the plurality of water outlets;
- the cyclone sand removal assembly is configured to extract the liquid at the bottom of the cooling tower, perform sand removal treatment on the liquid, and then discharge the sand-removed liquid into the bottom of the cooling tower.

2. The sand removal device according to claim 1, wherein the flushing assembly further comprises a first circulation pump and a second pipeline; and the first pipeline and the second pipeline are connected to the first circulation pump respectively;
- the first circulation pump is configured to extract the liquid at the bottom of the cooling tower through the second pipeline and output the liquid to the first pipeline.

3. The sand removal device according to claim 2, wherein the first pipeline is arranged at the bottom of the cooling tower and surrounds the bottom of the cooling tower.

4. The sand removal device according to claim 3, wherein a gap is provided between the first pipeline and the bottom of the cooling tower.

5. The sand removal device according to claim 3, wherein the plurality of water outlets in the first pipeline face the bottom of the cooling tower and have oblique angles relative to a vertical direction of the bottom of the cooling tower.

6. The sand removal device according to claim 1, wherein the cyclone sand removal assembly further comprises a third pipeline, a fourth pipeline, and a second circulation pump;
- the second circulation pump is connected to the bottom of the cooling tower and a water inlet of the cyclone sand removal assembly respectively through the third pipeline, and the second circulation pump is used to extract the liquid from the bottom of the cooling tower through the third pipeline, and transport the liquid into the water inlet of the cyclone sand removal assembly;
- the fourth pipeline is connected to a water outlet of the cyclone sand removal assembly and the bottom of the cooling tower respectively, and is configured to discharge the sand-removed liquid into the bottom of the cooling tower.

7. The sand removal device according to claim 6, wherein a connection point between the fourth pipeline and the bottom of the cooling tower is higher than a liquid level of the liquid at the bottom of the cooling tower.

8. The sand removal device according to claim 6, wherein the cyclone sand removal assembly has a sand outlet;
- the sand outlet is connected to a sand storage assembly;
- the sand storage assembly is configured to store accumulated sand discharged after the cyclone sand removal assembly performs a sand removal treatment on the liquid.

9. The sand removal device according to claim 8, wherein the sand storage assembly comprises at least one opening;
- each opening of the at least one opening is provided with a cover plate for opening or closing the opening;
- when the opening is opened, the accumulated sand is able to be taken out of the sand storage assembly through the opening.

10. The sand removal device according to claim 9, wherein the sand storage assembly is provided with a holding structure, and the holding structure is configured to hold the accumulated sand;
- an outer diameter of the holding structure is smaller than an inner diameter of the opening, and the holding structure is able to be taken out of the sand storage assembly through the opening.

11. The sand removal device according to claim 8, wherein the sand storage assembly is provided with a visual window;
- the visual window is configured to display the amount of the accumulated sand in the sand storage assembly.

12. The sand removal device according to claim 8, wherein the cyclone sand removal assembly further comprises a ball valve assembly;
- the ball valve assembly is arranged between the sand outlet and the sand storage assembly;
- the ball valve assembly is configured to open or close the communication between the sand outlet and the sand storage assembly.

13. A cooling tower structure, comprising a cooling tower and the sand removal device according to claim 1;

wherein the sand removal device is configured to remove sand from the liquid at the bottom of the cooling tower.

* * * * *